(12) United States Patent
Poerschke et al.

(10) Patent No.: US 10,962,241 B2
(45) Date of Patent: Mar. 30, 2021

(54) ENVIRONMENTAL CONTROL AND AIR DISTRIBUTION SYSTEM AND METHOD OF USING THE SAME

(71) Applicant: IBACOS, Inc., Pittsburgh, PA (US)

(72) Inventors: Andrew Poerschke, Pittsburgh, PA (US); Robert Beach, Pittsburgh, PA (US); Anthony Grisolia, West Leechburg, PA (US)

(73) Assignee: RHEIA, LLC, Phoenix, AZ (US)

( * ) Notice: Subject to any disclaimer, the term of this patent is extended or adjusted under 35 U.S.C. 154(b) by 40 days.

(21) Appl. No.: 16/313,643

(22) PCT Filed: Apr. 4, 2017

(86) PCT No.: PCT/US2017/025896
§ 371 (c)(1),
(2) Date: Dec. 27, 2018

(87) PCT Pub. No.: WO2018/004768
PCT Pub. Date: Jan. 4, 2018

(65) Prior Publication Data
US 2019/0170375 A1 Jun. 6, 2019

Related U.S. Application Data

(60) Provisional application No. 62/471,697, filed on Mar. 15, 2017, provisional application No. 62/355,572, filed on Jun. 28, 2016.

(51) Int. Cl.
*F24F 3/044* (2006.01)
*F24F 13/14* (2006.01)
(Continued)

(52) U.S. Cl.
CPC ............ *F24F 3/044* (2013.01); *F24F 13/10* (2013.01); *F24F 13/105* (2013.01); *F24F 13/14* (2013.01);
(Continued)

(58) Field of Classification Search
CPC ............ F24F 3/044; F24F 13/10; F24F 13/14
See application file for complete search history.

(56) References Cited

U.S. PATENT DOCUMENTS

| 4,117,716 A | 10/1978 | Simon |
| 4,540,118 A | 9/1985 | Lortie et al. |

(Continued)

FOREIGN PATENT DOCUMENTS

WO 2016044437 A1 3/2016

OTHER PUBLICATIONS

Poerschke, (The Time is Now: Advances in Small Ducts and Comfort), 2015, p. 1-10, IBACOS innovation.
(Continued)

*Primary Examiner* — Vincent H Tran
(74) *Attorney, Agent, or Firm* — The Webb Law Firm

(57) ABSTRACT

An indoor environmental control and air distribution system for a building includes: an air handling unit; a manifold connected to the air handling unit having a chamber formed by a plurality of walls and a plurality of orifices formed through at least one of the walls; air distribution conduits each independently having a first end connected to the orifices of the manifold and a second end extending out from the manifold into different zones throughout the building; and an airflow modulating device having one or more airflow regulating dampers independently configured to move into at least two positions in which each position provides a different percentage of total air volume to each air
(Continued)

distribution conduit. A method of using the indoor environmental control and air distribution system is also included.

20 Claims, 14 Drawing Sheets

(51) Int. Cl.
F24F 13/10 (2006.01)
F24F 110/10 (2018.01)
F24F 110/40 (2018.01)

(52) U.S. Cl.
CPC ....... F24F 2110/10 (2018.01); F24F 2110/40 (2018.01)

(56) References Cited

U.S. PATENT DOCUMENTS

| | | | |
|---|---|---|---|
| 4,549,601 A | 10/1985 | Wellman et al. | |
| 4,931,948 A | 6/1990 | Parker et al. | |
| 7,390,251 B2 | 6/2008 | Hadlock, Jr. | |
| 7,410,416 B2 | 8/2008 | Fettkether | |
| 2002/0102936 A1 | 8/2002 | Daumler | |
| 2004/0194484 A1* | 10/2004 | Zou | F24F 3/0442 62/186 |
| 2005/0095978 A1* | 5/2005 | Blunn | F24F 11/0001 454/229 |
| 2005/0156054 A1 | 7/2005 | Shah | |
| 2006/0186213 A1* | 8/2006 | Carey | F24F 3/0442 236/1 B |
| 2007/0209653 A1* | 9/2007 | Beisheim | F23N 3/002 126/80 |
| 2008/0113602 A1 | 5/2008 | Golm et al. | |
| 2008/0264405 A1* | 10/2008 | Van Becelaere | A62C 2/241 126/287.5 |
| 2008/0318514 A1 | 12/2008 | Fettkether | |
| 2009/0038659 A1 | 2/2009 | Ragozzino | |
| 2010/0062704 A1 | 3/2010 | Markovich | |
| 2011/0162901 A1 | 7/2011 | Lucas et al. | |
| 2012/0037713 A1* | 2/2012 | Holoch | A62C 2/247 236/49.3 |
| 2012/0168117 A1* | 7/2012 | Jairazbhoy | B60H 1/00028 165/48.1 |
| 2012/0239208 A1* | 9/2012 | Federspiel | F24F 11/77 700/277 |
| 2013/0161403 A1 | 6/2013 | Douglas et al. | |
| 2013/0186010 A1 | 7/2013 | Condie | |
| 2013/0233306 A1 | 9/2013 | Snow | |
| 2014/0148088 A1 | 5/2014 | Fitzgerald et al. | |
| 2014/0207258 A1 | 7/2014 | DiFulgentiz, III et al. | |
| 2014/0355248 A1* | 12/2014 | Cursetjee | F24F 13/078 362/96 |
| 2014/0371876 A1* | 12/2014 | Isaacson | G05B 15/02 700/9 |
| 2015/0362256 A1* | 12/2015 | Josserand | F28D 7/0058 165/104.19 |
| 2016/0054910 A1* | 2/2016 | Hughes | G01M 99/005 715/735 |
| 2016/0146497 A1* | 5/2016 | Chapman | G06K 7/0008 700/276 |
| 2016/0245541 A1* | 8/2016 | Karamanos | F24F 11/30 |
| 2017/0374760 A1* | 12/2017 | Chen | G06F 1/20 |

OTHER PUBLICATIONS

Wilson, (Our Top-Efficiency Heat-Recovery Ventilator), 2014, Green Building Advisor, https://www.greenbuildingadvisor.com/article/our-top-efficiency-heat-recovery-ventilator.

* cited by examiner

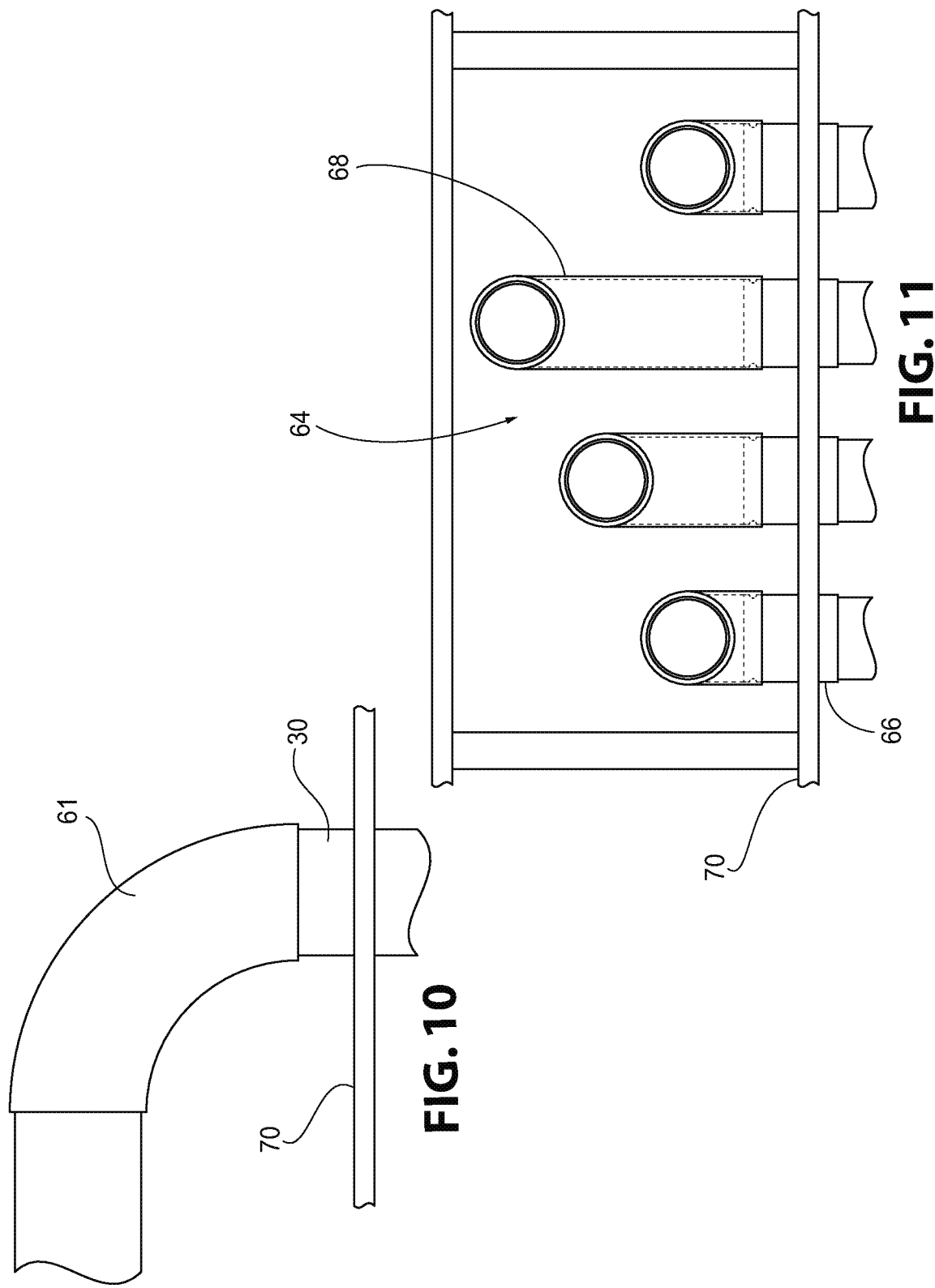

ENVIRONMENTAL CONTROL AND AIR DISTRIBUTION SYSTEM AND METHOD OF USING THE SAME

CROSS-REFERENCE TO RELATED APPLICATIONS

This application is the United States national phase of International Application No. PCT/US2017/025896 filed Apr. 4, 2017, and claims the benefit of U.S. Provisional Patent Application Nos. 62/355,572, filed Jun. 28, 2016, and 62/471,697, filed Mar. 15, 2017, the disclosures of which are incorporated herein by reference in their entirety.

STATEMENT REGARDING FEDERALLY SPONSORED RESEARCH

This invention was made with government support under Government Contract No. DE-EE0007058 awarded by the Department of Energy.

BACKGROUND OF THE INVENTION

Field of the Invention

The present invention is directed to an indoor environmental control and air distribution system for buildings as well as methods for controlling an indoor environment of a building.

Description of Related Art

Heating, ventilation, and air conditioning units (also referred to as HVAC units) are commonly used to control the climate in a building and provide a level of comfort to the occupants. Typically, HVAC units include ductwork, a fan, a thermostat, and devices that heat or cool the air. During operation, an HVAC unit distributes heated or cooled air to maintain a desired temperature set-point based on sensed temperature from the thermostat. Once the desired temperature set-point is reached, the air is turned off. When there is a temperature change, the HVAC unit will again distribute heated or cooled air to reach the desired temperature set-point.

As will be appreciated, such HVAC units and control systems have various drawbacks. For instance, because most HVAC units are continually shut on and off in order to maintain a desired temperature, the temperature continuously fluctuates above and below the desired temperature. In addition, HVAC units are typically controlled by systems that only use current temperature readings and do not take into account other parameters such as humidity, light intensity, and the like, which also contributes to the occupant's comfort within the building. Thus, it is desirable to provide a system that overcomes the drawbacks associated with current systems and which more efficiently controls the indoor environment of a building.

In addition, a building undergoes continuous change based on the weather. As such, the amount of conditioning necessary to maintain comfort in a building varies throughout the year. Industry standards recommend adjusting the balance of airflow, or the percentage of air going into each room, as well as the total airflow, at least seasonally, to account for these seasonal weather changes. It is, therefore, desirable to also provide an improved system that accounts for seasonal and daily weather changes to maintain comfort in a building.

SUMMARY OF THE INVENTION

In some embodiments, the present invention is directed to an indoor environmental control and air distribution system for a building that includes: an air handling unit; a manifold connected to the air handling unit, the manifold comprising a chamber formed by a plurality of walls and a plurality of orifices formed through at least one of the walls; air distribution conduits each independently having a first end connected to the orifices of the manifold and a second end extending out from the manifold into different zones throughout the building; and an airflow modulating device comprising one or more airflow regulating dampers independently configured to move into at least two positions in which each position provides a different percentage of total air volume to each air distribution conduit.

In certain embodiments, the system can also include sensor devices positioned in at least one of the zones of the building, the sensor devices configured to determine temperature. In addition, the system can further include a controller in operable communication with the sensor devices in which the controller is configured to automatically control at least the air handling unit. Moreover, the system can include one or more computer-readable storage mediums in operable communication with the controller and containing programming instructions that, when executed, cause the controller to adjust a positioning of the modular airflow regulating device when at least a temperature set-point is exceeded.

In some embodiments, the airflow regulating dampers are adjusted in concert such that each air distribution conduit receives a desired percentage of air flow based on a total volume of air supplied by the air handling unit. The manifold can also include ports formed through at least a second wall of the chamber as well as a firestop mechanism formed within the chamber that is configured to prevent the spread of combustion.

In certain embodiments, the air distribution conduits have a diameter of 3.5 inches or less and can be made of a plastic material. The airflow regulating dampers can also have pressure sensors configured to determine volumetric airflow rate in which the pressure sensors are in operable communication with the controller. Further, at least one of the airflow regulating dampers can be a firestop damper that is configured to close in response to a predetermined temperature.

In some embodiments, the air terminals are positioned within the different zones of the buildings and are configured to mix and diffuse air exiting the second end of the airflow regulating dampers while minimizing pressure loss and noise transmission, wherein the air terminals comprise sensors that are configured to determine temperature. The sensors can also be configured to determine at least one of relative humidity, organism occupancy, carbon dioxide, infrared light intensity, and visible light intensity.

In some embodiments, the airflow modulating device is a separate container that is inserted into the manifold through a slot. The container can include a plurality of holes with the airflow regulating dampers positioned within each of the holes in which each hole of the container is aligned with each orifice formed through the wall of the manifold. The manifold can further include an additional slot that receives a cleaning device.

In certain embodiments, the present invention is also directed to a method for controlling an indoor environment of a building that includes: measuring at least temperature with sensors positioned throughout a building; and adjusting an amount of airflow into each room of the building when the measured temperature exceeds or drops below a temperature set-point or range, wherein the amount of airflow is controlled by adjusting a position of one or more airflow regulating dampers of an airflow modulating device, and wherein the airflow regulating dampers are independently configured to move into at least two positions in which each position provides a different percentage of total air volume to each air distribution conduit.

In some embodiments, at least one temperature sensor value is predicted by a model designed to accept as an input the other sensors positioned throughout the building, and the predicted temperature is used as the temperature set-point or range. Further, the position of the airflow regulating dampers can be automatically adjusted by a controller in operable communication with one or more computer-readable storage mediums.

In certain embodiments, the method further comprises automatically regulating air from the air handling unit with the controller in operable communication with the one or more computer-readable storage mediums. The controller can also be used to determine an operative temperature in each zone of the building based on sensor measurements taken from a perimeter of each zone that are correlated to expected average zone conditions.

In some embodiments, the sensors are further configured to determine an additional condition of each zone to adjust the amount of airflow, and wherein the additional condition is selected from relative humidity, organism occupancy, carbon dioxide, infrared light intensity, visible light intensity, or a combination thereof.

BRIEF DESCRIPTION OF THE DRAWINGS

FIG. 10 is a side view of a conduit bending device having a swivel sleeve positioned over an air distribution conduit;

FIG. 11 is a side view of multiple conduit bending devices having a swivel sleeve positioned over an air distribution conduit;

DESCRIPTION OF THE INVENTION

Figure 1:
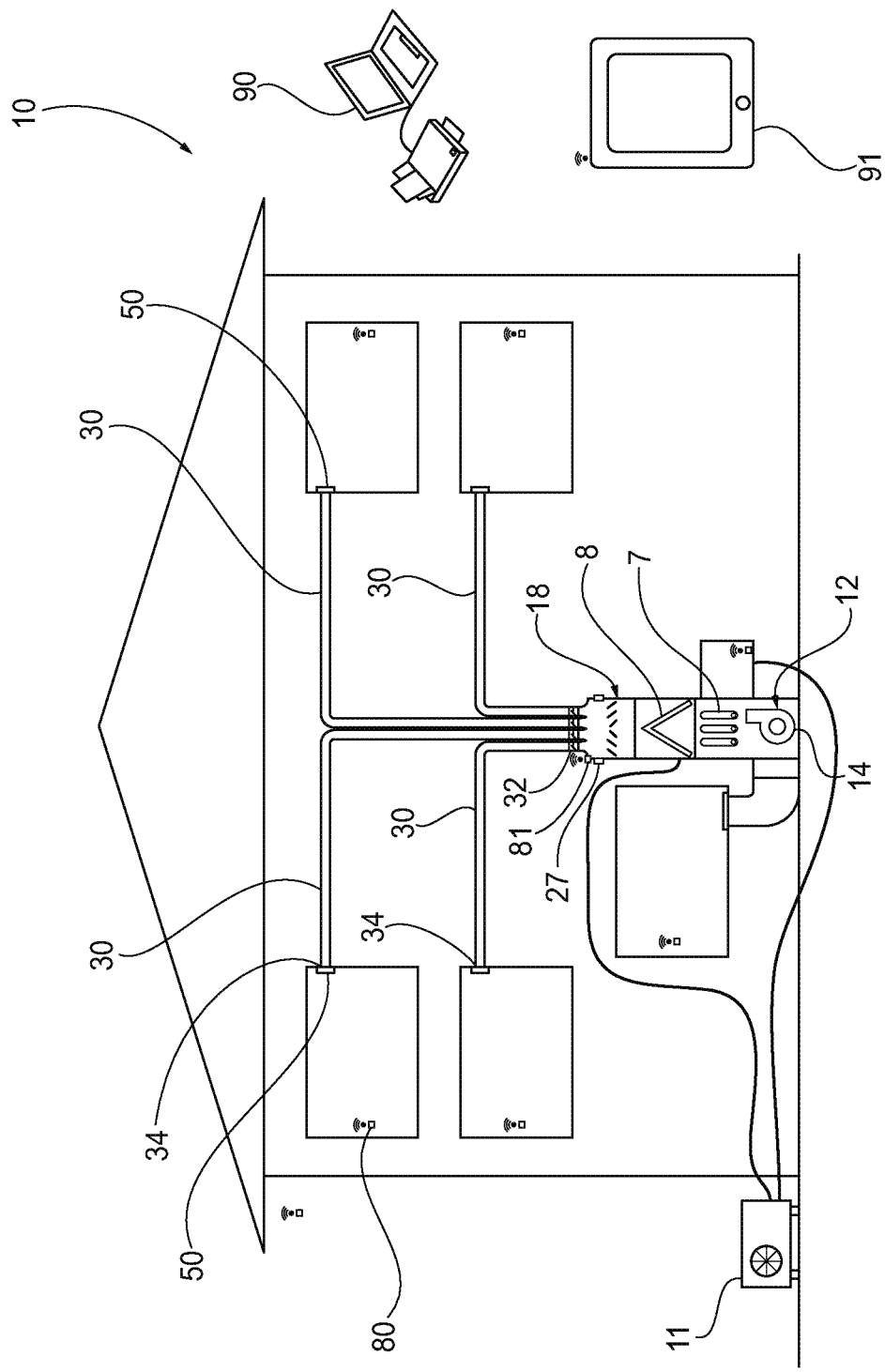
FIG. 1 is a perspective of an indoor environmental control and air distribution system according to the present invention.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Further, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the specification, are simply exemplary embodiments of the invention. Hence, specific dimensions and other physical characteristics related to the embodiments disclosed herein are not to be considered as limiting.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The present invention includes an indoor environmental control and air distribution system 10. Referring to FIG. 1, the system 10 includes an air handling unit 12 that provides air into the system 10. The air handling unit 12 can include a fan or blower 14, such as a centrifugal type blower, to provide the air. When the air handling unit 12 uses a centrifugal type blower, a variable speed ECM motor can be used to power and control the speed of the centrifugal type blower. The ECM motor can be automatically controlled to adjust the motor speed to fit the desired airflow rate and static pressure.

The air handling unit 12 also includes heating and cooling elements 7, 8. Non-limiting examples of heating and cooling elements 7, 8 include a heat pump system which heats or cools the air with a single coil, a combustion furnace to heat the air while a heat pump cools the air, a hydronic coil that heats and cools the air, and a combination thereof. The air handling unit 12 can also include various other components. For instance, the air handling unit 12 can also include an air filtration mechanism. Non-limiting examples of air filtration mechanisms include passive air filters, such as pleated mesh filters and activated carbon filtration, and active plate type filters.

As shown in FIG. 1, the air handling unit 12 is connected to an outdoor air unit 11 and an indoor manifold 18. The outdoor air unit 11 provides thermal energy to heat or cool air passing through the air handling unit 12, and the indoor manifold 18 helps distribute the air from the air handling unit 12. The air handling unit 12 is typically connected directly to the outdoor unit 11 via a refrigerant line set. Further, the air handling unit 12 can be connected directly to the manifold 18 or the air handling unit 12 can be connected indirectly to the manifold 18. For example, the air handling unit 12 can be connected indirectly to the manifold 18 through a plenum duct. The system 10 can also include multiple manifolds 18 that are connected to the air handling unit 12.

Figure 2:
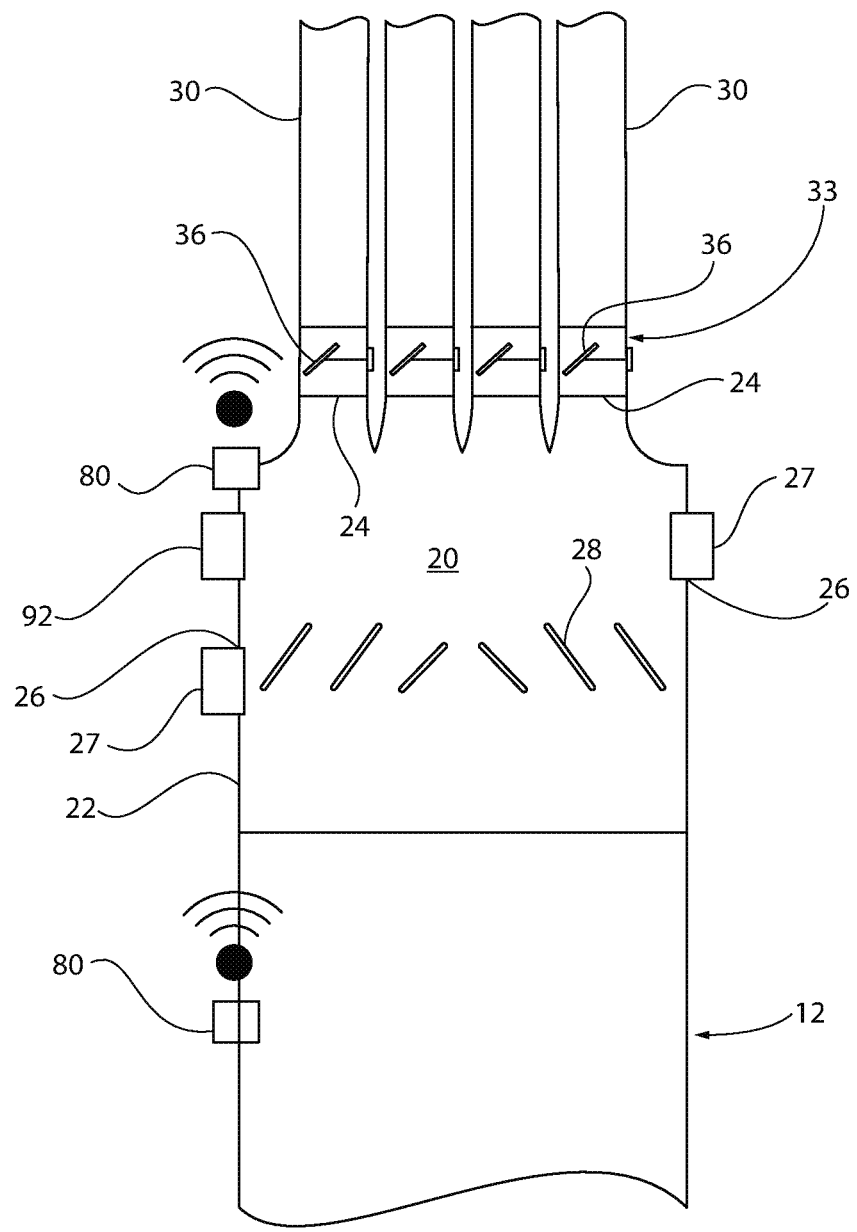
FIG. 2 is an enlarged perspective view of an air handling unit, manifold, and air distribution conduits shown in FIG. 1.

Referring to FIG. 2, the manifold 18 comprises a chamber 20 formed by a plurality of walls 22 with a plurality of orifices 24 formed through at least one of the walls 22. The orifices 24 are configured to release air received from the air handling unit 12. Even air distribution through the manifold 18 can be accomplished with air turbulence generated within the space of the manifold 18 using a finned diffuser. In some embodiments, the manifold 18 also includes ports 26 formed through at least one of the walls 22. The ports 26 can be pre-installed during the manufacturing of the manifold 18. The ports 26 allow easy installation of add on components 27 such as air purification devices, UV lamps, scent sprayers, advanced sensors, and the like. Moreover, to help prevent the spread of combustion, the manifold 18 can further include a firestop mechanism 28. The firestop mechanism 28 allows the use of additional components that do not comply with current fire codes. For example, by using a firestop mechanism 28, the system 10 can utilize plastic piping for distributing air from the manifold 18. This firestop mechanism 28 can also improve the mixing of air within the manifold 18 to provide even air distribution.

Figure 3:
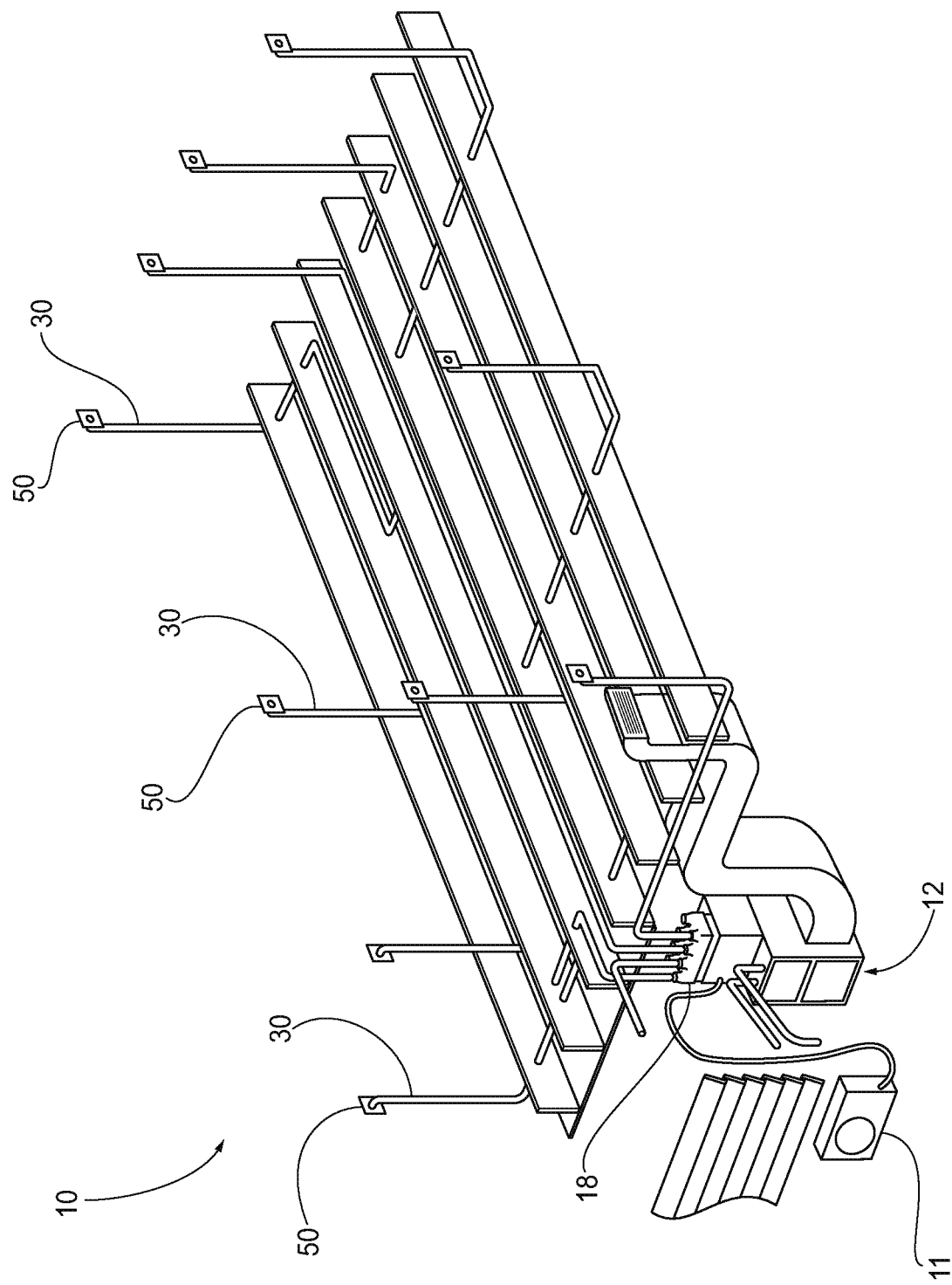
FIG. 3 is cross-sectional view of the indoor environmental control and air distribution system shown in FIG. 1.

Referring to FIGS. 1 and 2, a plurality of air distribution conduits 30 can extend out from the orifices 24 of the manifold 18 into different zones or rooms throughout the building. For instance, and as shown in FIG. 1, the air distribution conduits 30 each have a first end 32 connected to an orifice 24 formed through the manifold 18 and a second end 34 that extends into a certain room such that air distributed from the air handling unit 12 can be transported through the air distribution conduits 30 and into one or more zones or rooms. FIG. 3 further shows the various air distribution conduits 30 extending from the manifold 18 into different zones or rooms throughout the building.

The air distribution conduits 30 can comprise various sizes and shapes. In some embodiments, the air distribution conduits 30 have a diameter of 3.5 inches or less, and are constructed of a smooth round material. In such embodiments, connectors and mounting hardware reduce the amount of air leakage and provide easy installation of the air distribution conduits 30. Alternatively, the air distribution conduits 30 can be made of a flexible duct material that does not require additional connectors and mounting hardware. The air distribution conduits 30 can also be independently detached from the manifold 18 to allow for easy cleaning such as with the use of a vacuum.

It is appreciated that the manifold 18 serves as a connection passage between the air handling unit 12 and the air distribution conduits 30. As such, air from the air handling unit 12 enters the manifold 18 and is distributed to the air distribution conduits 30. The manifold 18 can have a particular shape that provides an even air movement potential (static pressure) at the beginning of each air distribution conduit 30 runout. The entry of the air distribution conduits 30 can also be shaped to minimize the energy loss of the flowing air. For instance, the air distribution conduits 30 can have curved entry regions to minimize energy loss.

As shown in FIG. 2, the system 10 includes an airflow modulating device 33 comprising one or more, such as a plurality of, modular airflow regulating dampers 36 positioned within and/or around the plurality of orifices 24 of the manifold 18. In some embodiments, the modular airflow regulating dampers 36 are positioned between the air distribution conduit 30 runouts and the manifold 18. The modular airflow regulating dampers 36 are configured to reduce or prevent airflow into the air distribution conduits 30, which, in turn, reduces or prevents airflow into the different zones/rooms. The modular airflow regulating dampers 36 are also configured to minimize pressure drops while airflow is being restricted. In some embodiments, connectors are associated with the modular airflow regulating dampers 36 to allow the dampers 36 to slide into place within the manifold 18. Electric conductors can also be embedded within the connectors. In another embodiment, power and control wires are connected externally.

Figure 4:
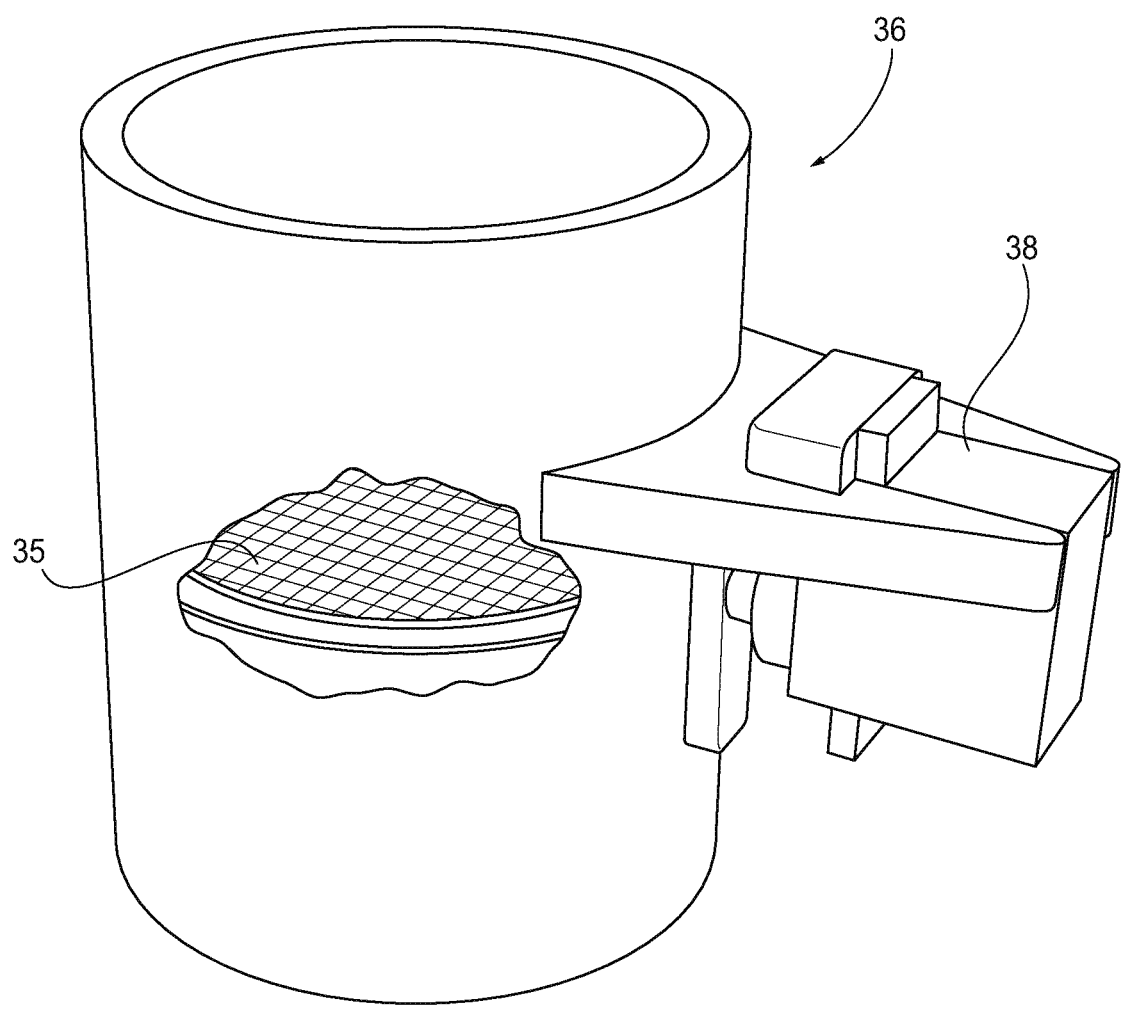
FIG. 4 is a perspective view of an adjustable flap airflow regulating damper.
Figure 5:
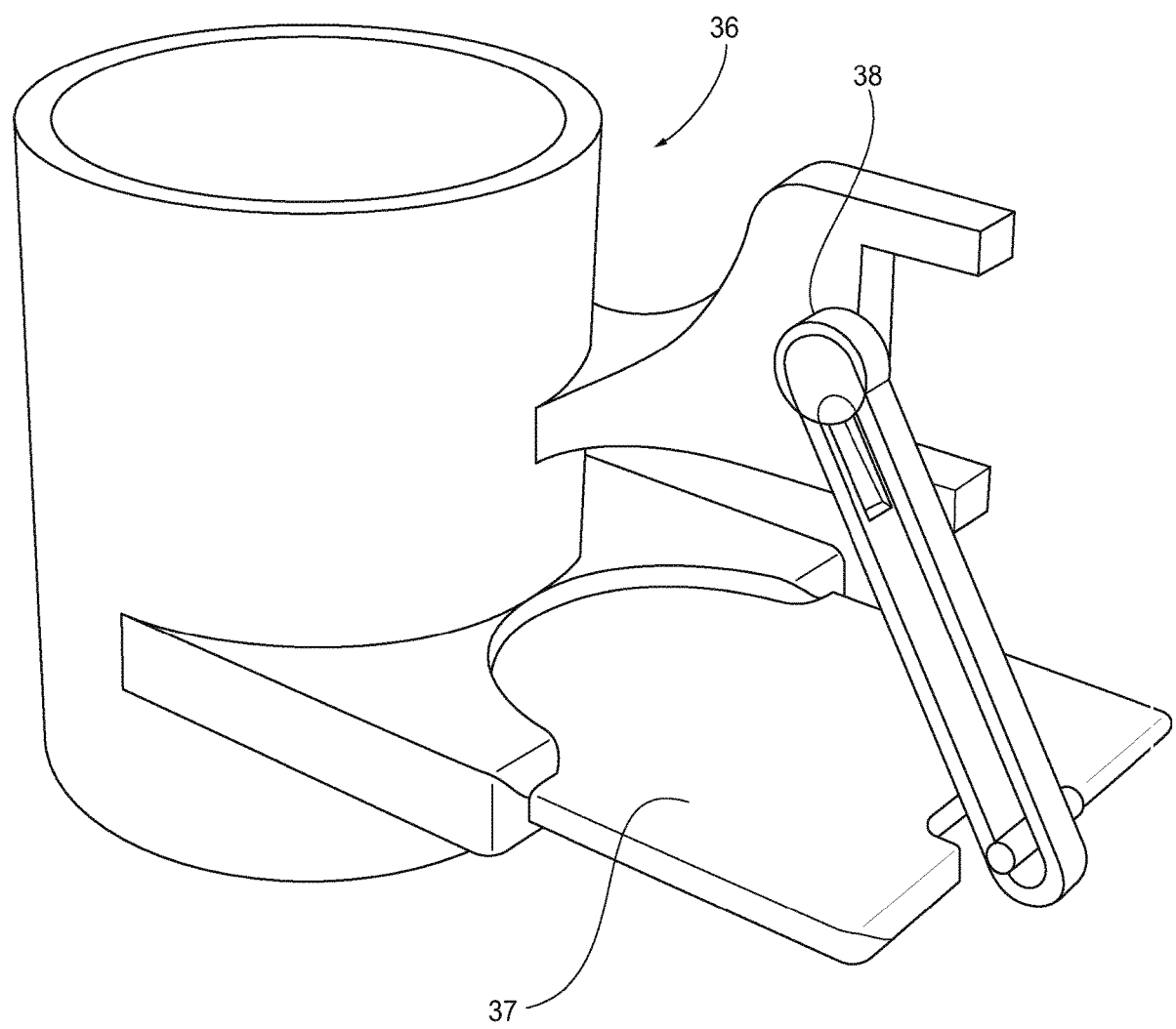
FIG. 5 is a perspective view of a gate controlled airflow regulating damper.
Figure 6:
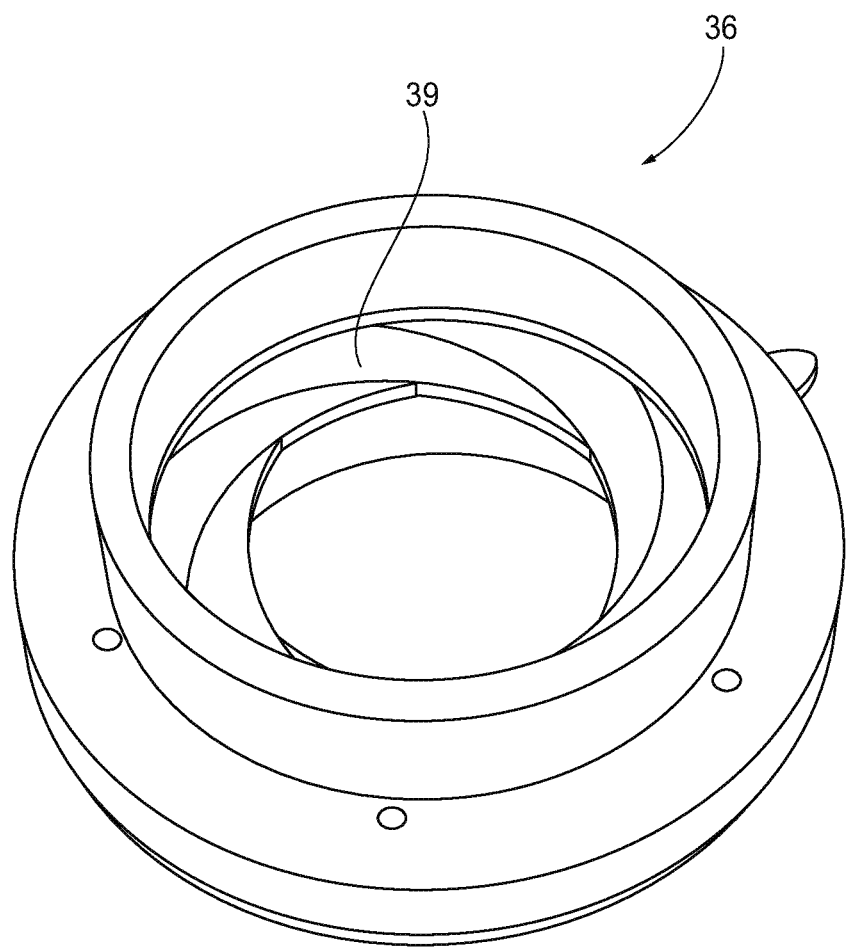
FIG. 6 is a perspective view of an airflow regulating damper that uses an iris.

Non-limiting examples of suitable modular airflow regulating dampers 36 include flap type dampers, sliding sluice gate type dampers, and iris dampers. FIG. 4 illustrates an airflow regulating damper 36 with an adjustable flap 35 that is controlled by a control motor 38. Further, FIG. 5 illustrates an airflow regulating damper 36 that uses a gate 37 controlled by the control motor 38, and FIG. 6 illustrates an airflow regulating damper 36 that uses an iris 39 controlled by the control motor 38.

In accordance with the present invention, the airflow regulating dampers 36 are each independently controlled to allow a desired amount of air into each air distribution conduit 30. For instance, the airflow regulating dampers 36 can be independently configured to move into at least two positions in which each position provides a different percentage of total air volume to each air distribution conduit 30. It is appreciated that the airflow regulating dampers 36 can be independently configured to move in numerous positions, such as three or more, or four or more, or five or more positions, to provide a desired percentage of total air volume to each air distribution conduit 30. Further, in some embodiments, the airflow regulating dampers 36 are adjusted to different positions in concert such that each air distribution conduit 30 receives a desired percentage of air flow based on a total volume of air supplied by the air handling unit 12.

In certain embodiments, the control motor 38 is used to actuate the airflow regulating dampers 36 to a desired position to allow a certain amount of air through air distribution conduit 30. In such embodiments, a separate motor 38 is associated with each individual damper 36 such that different zones/rooms can have different air flow rates and temperatures if desired by independently adjusting each airflow regulating dampers 36 to a desired position. In another embodiment, a solenoid or stepper motor is used to actuate the dampers 36. In a further embodiment several dampers are controlled by a single motor via a mechanical connection. In yet another embodiment, memory wire or a material which changes shape due to a thermal expansion is used to control the dampers 36.

Figure 7:
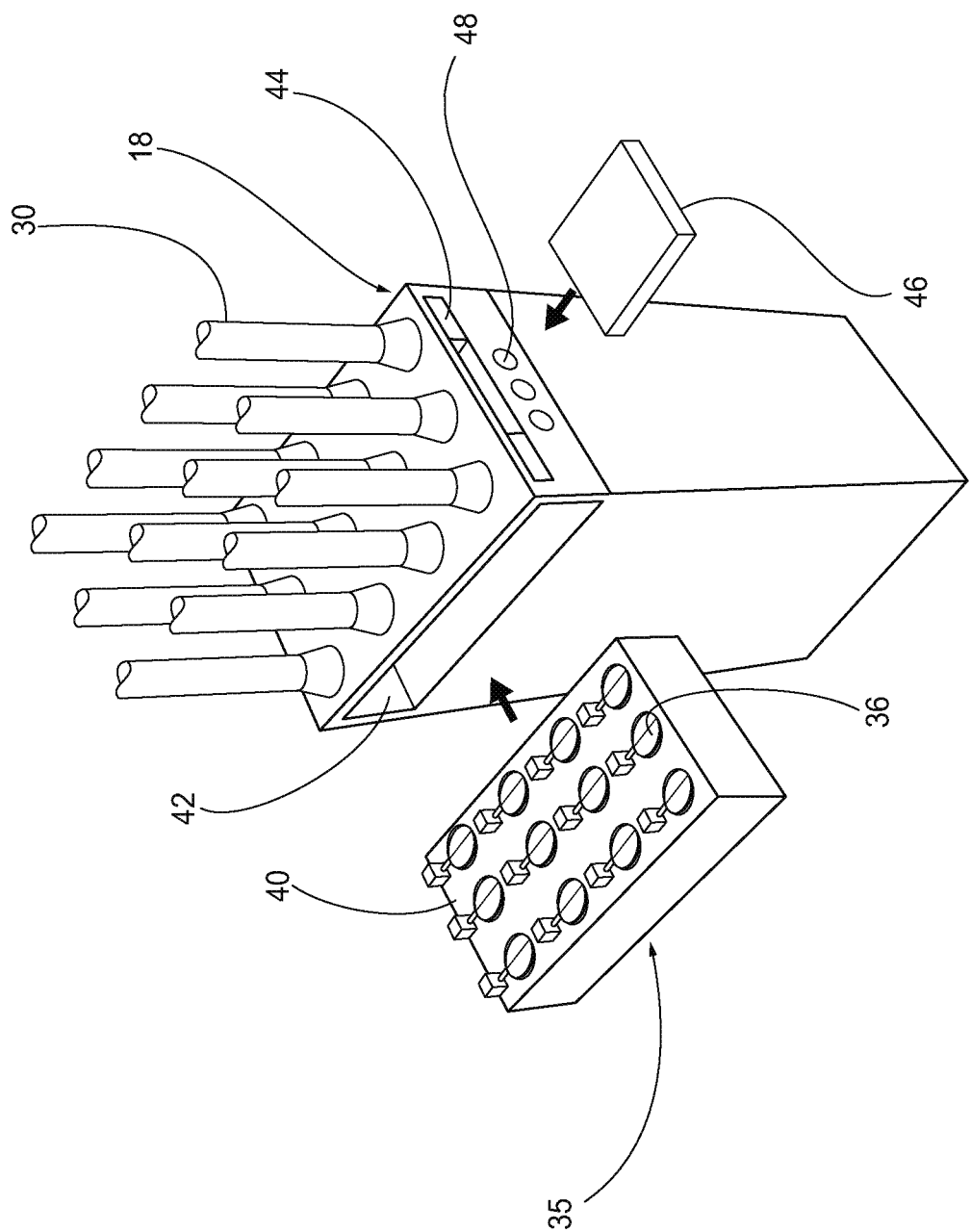
FIG. 7 is a perspective view of another embodiment of a manifold with multiple slots and airflow regulating dampers arranged in a separate container.

In some embodiments, referring to FIG. 7, the airflow modulating device 35 comprising the airflow regulating dampers 36 is a separate container 40 that is inserted into the manifold 18 through a slot 42. The container 40 includes a plurality of holes with the airflow regulating dampers 36 positioned within each of the holes. When inserted into the slot 42 of the manifold, each hole of the container 40 is aligned with an orifice 24 formed through the wall 22 of the manifold 18. During operation, air is distributed through the holes in the container 40 and out the orifices 24 of the manifold 18 into the air distribution conduits 30. To control the amount of air entering the air distribution conduits 30, the airflow regulating dampers 36 positioned within the holes in the container 40 are each independently controlled automatically to allow a desired amount of air into each air distribution conduit 30 as previously described. Further, because the container 40 can be removed from the manifold 18, the airflow regulating dampers 36 can be easily cleaned or replaced with a container 40 having different airflow regulating dampers 36.

As further shown in FIG. 7, the manifold 18 can also include an additional slot 44. The additional slot 44 can be configured to receive a cleaning device 46 that releases a cleaning material as air is distributed out of the manifold 18 and into the air distribution conduits 30. As a result, the cleaning material is distributed into the air distribution conduits 30. The manifold 18 can also include cleaning controls 48 that can be used to control the cleaning device 46.

Pressure sensors can also be used to determine the exact volumetric airflow rate. For instance, in certain embodiments, a pressure sensor is located in the manifold 18 cavity and in each of the dampers 36. The pressure difference can then be calculated to determine the volumetric airflow rate. In some embodiments, a differential pressure transducer measures the pressure drop through the dampers 36. This information, along with the dampers 36 positions, can be used to determine the airflow based on performance maps. The performance maps can be empirically derived.

In certain embodiments, the dampers 36 are constructed of a material that serves as a firestop. This construction mitigates the need for an additional fire damper 36 within the manifold 18. For example, the top of the manifold 18 and dampers 36 can be constructed of metal or another fireproof material. During operation, the metal dampers 36 can be closed to prevent the spread of flame or smoke. Additional modules can be placed after the dampers 36 to alter the properties of the airflow. In certain embodiments, small reheat coils are placed after the dampers 36 when the system is dehumidifying. Scent dispersants can also be placed after the dampers 36 to distribute scented air to each room.

Referring to FIG. 1, the system 10 also includes air terminals 50 that help deliver air from the air distribution conduits 30 and into the zones/rooms of the building. The terminals 50 mix and diffuse the air while minimizing pressure loss and noise transmission. In some embodiments, the air terminals 50 are diffusers that spread and mix the air into the zones/rooms. The specific shape of the diffuser may enhance mixing and throw. The air terminals 50 can have a rounded outlet which allows the air to throw into the zone as a jet. The air terminals 50 can also have active elements that adjust the direction of the air. These elements can be controlled electrically or thermally. For example, an electric motor can be used to adjust the angle of the diffuser to direct air upward during the cooling mode and downward during the heating mode. In other embodiments, a thermally expansive element, such as a bi-metallic strip, can be used to adjust the fin angle based on air delivery temperature and direct cooling air upward and heating air downward. The air terminals 50 can also be placed in different areas of each zone such as in a high sidewall to maximize mixing within the zone, while minimizing the potential of blowing air directly onto occupants.

It is appreciated that the air distribution conduits 30 are shaped and configured to distribute air into the air terminals 50 positioned throughout one or more rooms/zones. In certain embodiments, one or more of the air distribution conduits 30 have at least one bend that leads to an air terminal 50. As shown in FIGS. 8-11, a conduit bending device 54 can be used to help secure the bend formed in a portion of one or more of the air distribution conduits 30. The conduit bending device 54 also prevents the air distribution conduits 30 from moving.

Figure 8:
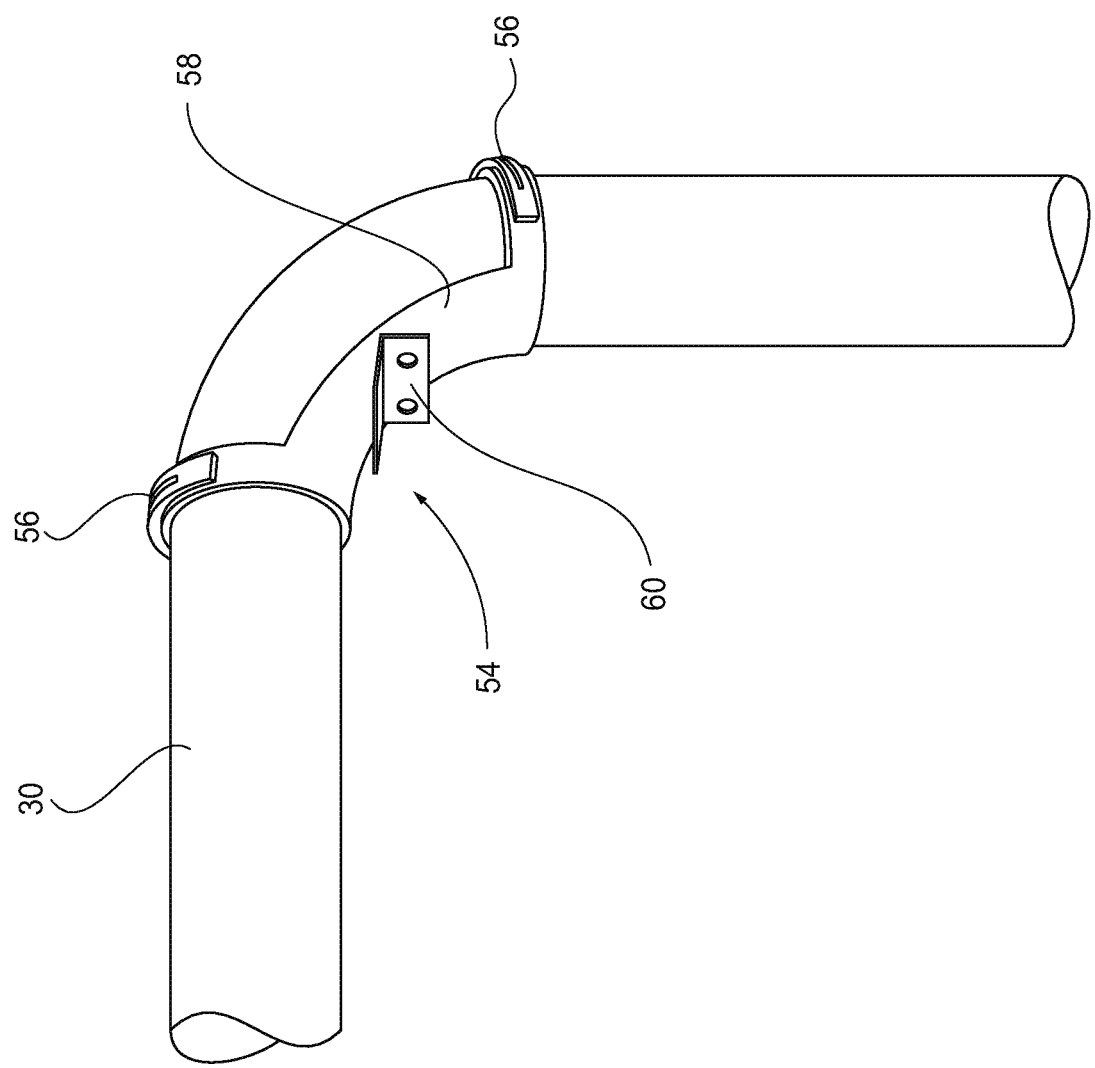
FIG. 8 is a perspective view of a conduit bending device having clasps attached to an air distribution conduit.

In some embodiments, referring to FIG. 8, the conduit bending device 54 can include an adjustable clasp 56 at each end of the device 54 and a support 58 extending between the two clasps 56. The support 58 is shaped to engage a bend formed in an air distribution conduit 30. During assembly of the system 10, the clasps 56 are attached to areas of the air distribution conduit 30 located before and after the bended portion. The support 58 that is attached to both clasps 56 engages at least a portion of bend to secure the air distribution conduit 30 and help maintain the shape of the bend. The support 58 can also include a fastener 60, such as a flange, that can be attached to a stud or other substrate/surface to further secure the positioning of the air distribution conduit 30.

Figure 9B:
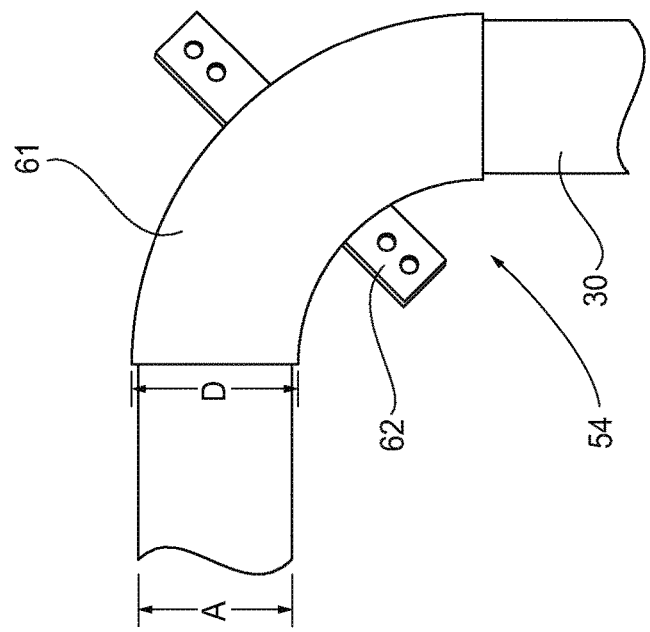
FIG. 9B is a side view of the conduit bending device shown in FIG. 9A.
Figure 9A:
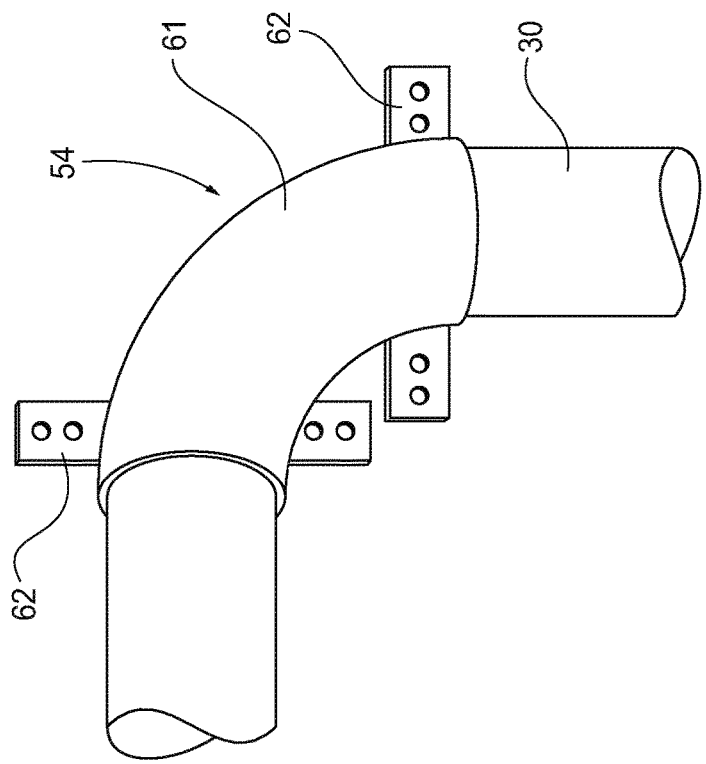
FIG. 9A is a perspective view of a conduit bending device having a sleeve positioned over an air distribution conduit.

As shown in FIGS. 9A, 9B, and 10, the conduit bending device 54 can also include a sleeve 61 that is positioned over a bend formed in an air distribution conduit 30. The sleeve 61 has a diameter that is larger than the diameter of the air distribution conduit 30 so that the air distribution conduit 30 can be positioned through the sleeve 61. It is appreciated that the diameter is also sized to prevent the sleeve 61 from sliding along the bend and allowing the bend to move. In some embodiments, the sleeve can have an inner radius selected within a range of from 0.5 inch to 1.5 inches, or from 0.8 inch to 1.2 inches, or about 1 inch. The sleeve 61 can further include a fastener 62, such as a flange, that can be attached to a stud or other substrate/surface to further secure the positioning of the air distribution conduit 30.

Referring to FIG. 11, a swivel sleeve 64 can be used to rotate to different positions which, in turn, adjusts the position of the air distribution conduit 30. As shown in FIG. 11, the swivel sleeve 64 can include: (i) a first linear portion 66 with a first diameter that is placed over a linear segment of an air distribution conduit 30; and (ii) a second curved portion 68 with a second diameter that is placed over a bend in the air distribution conduit 30 and partially over the first linear portion 66 of the swivel sleeve 64. It is appreciated that the second diameter of the second portion 68 is larger than the first diameter of the first portion 66 such that the second portion 68 overlaps and engages the first portion 66. FIG. 11 also illustrates the use of a distribution panel 70.

Figure 13:
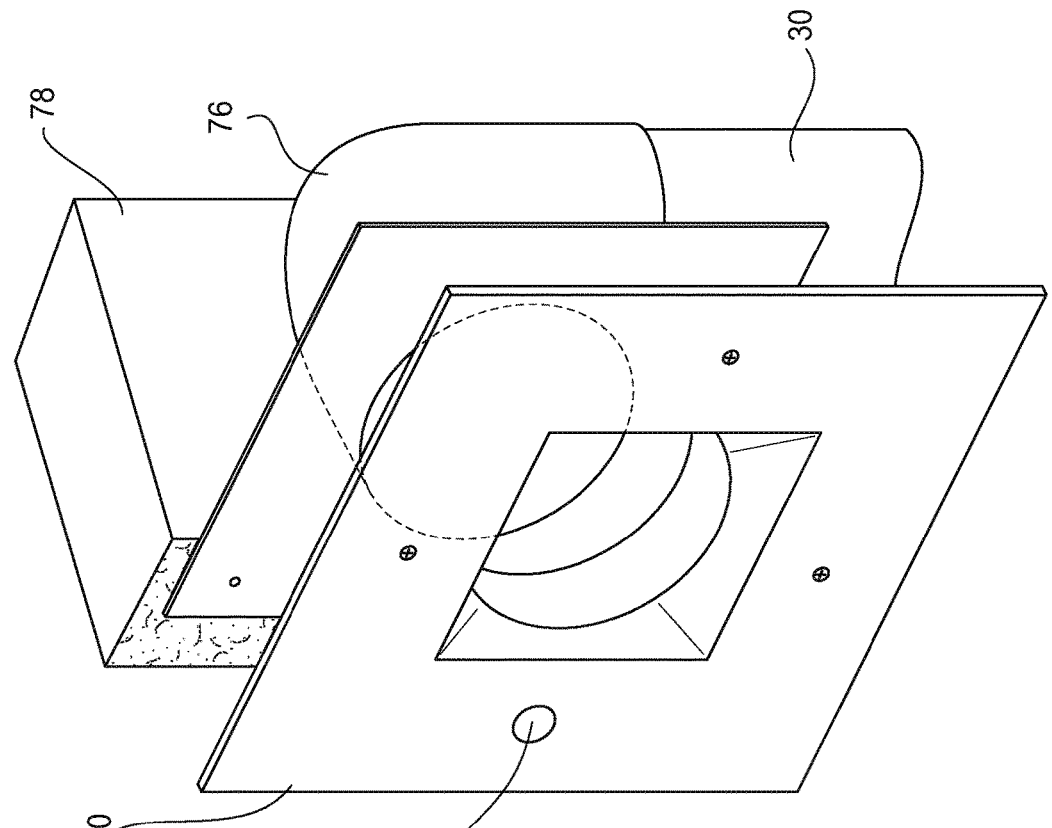
FIG. 13 is a perspective view of a rigid elbow attached to an air distribution conduit and an air terminal.
Figure 12:
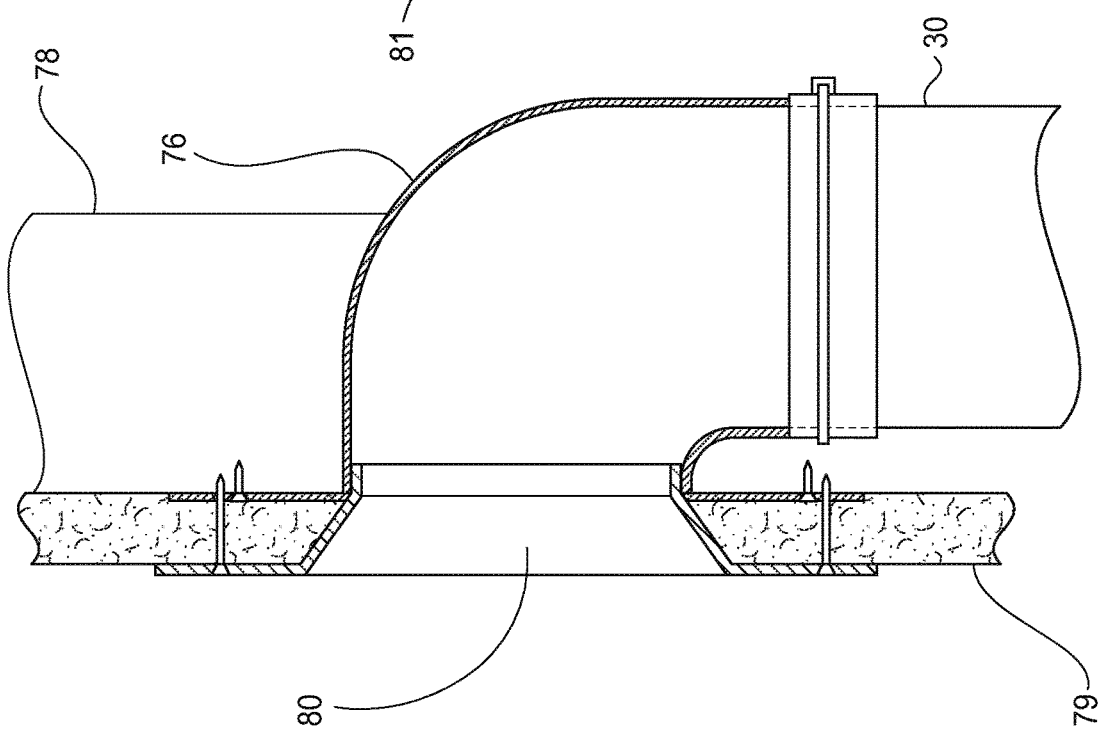
FIG. 12 is a side view of a rigid elbow attached to an air distribution conduit.

In certain embodiments, referring to FIGS. 12 and 13, the air distribution conduits 30 include a rigid elbow 76 that connects an air distribution conduit 30 to the air terminals 50. The rigid elbow 76 can be made of a material such as plastic, steel, or a combination thereof. The rigid elbow 76 can also be made of the same material or a different material than the material that forms the air distribution conduits 30. The rigid elbow 76 can be attached to the air distribution conduit 30, such as to the second end 34 of the air distribution conduit 30, by various means including, but not limited to, a snap fit, a clasp, or a threaded connection. As further shown in FIG. 12, the rigid elbow 76 is also attached to a portion of the building such as to the studs 78 and/or drywall 79 where an opening 80 leading into a room/zone is located. Referring to FIG. 13, an air terminal 50 can be placed over the opening 80 and attached to the rigid elbow 76. It is appreciated that the air distribution conduits 30 can optionally include both a rigid elbow 76 and a bend formed in a portion of the conduits 30 with a conduit bending device 54.

The indoor environmental control and air distribution system 10 also includes sensors 81. As shown in FIG. 1, the system 10 includes at least one sensor 81 placed in at least one of the zones/rooms of the building. In some embodiments, each room contains at least one sensor 81. The sensors 81 are configured to measure at least temperature. The sensors 81 can also measure one or more additional parameters selected from relative humidity, organism occupancy, carbon dioxide, infrared light intensity, and visible light intensity. The sensors 81 may be battery powered and connect wirelessly to a base station. Alternatively, the sensors 81 may be hard wired.

Figure 14:
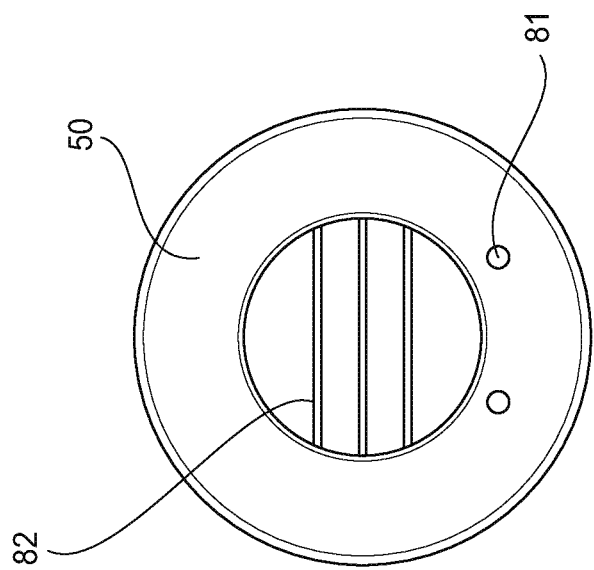
FIG. 14 is a front view of an air terminal having a sensor and air guides.
Figure 15:
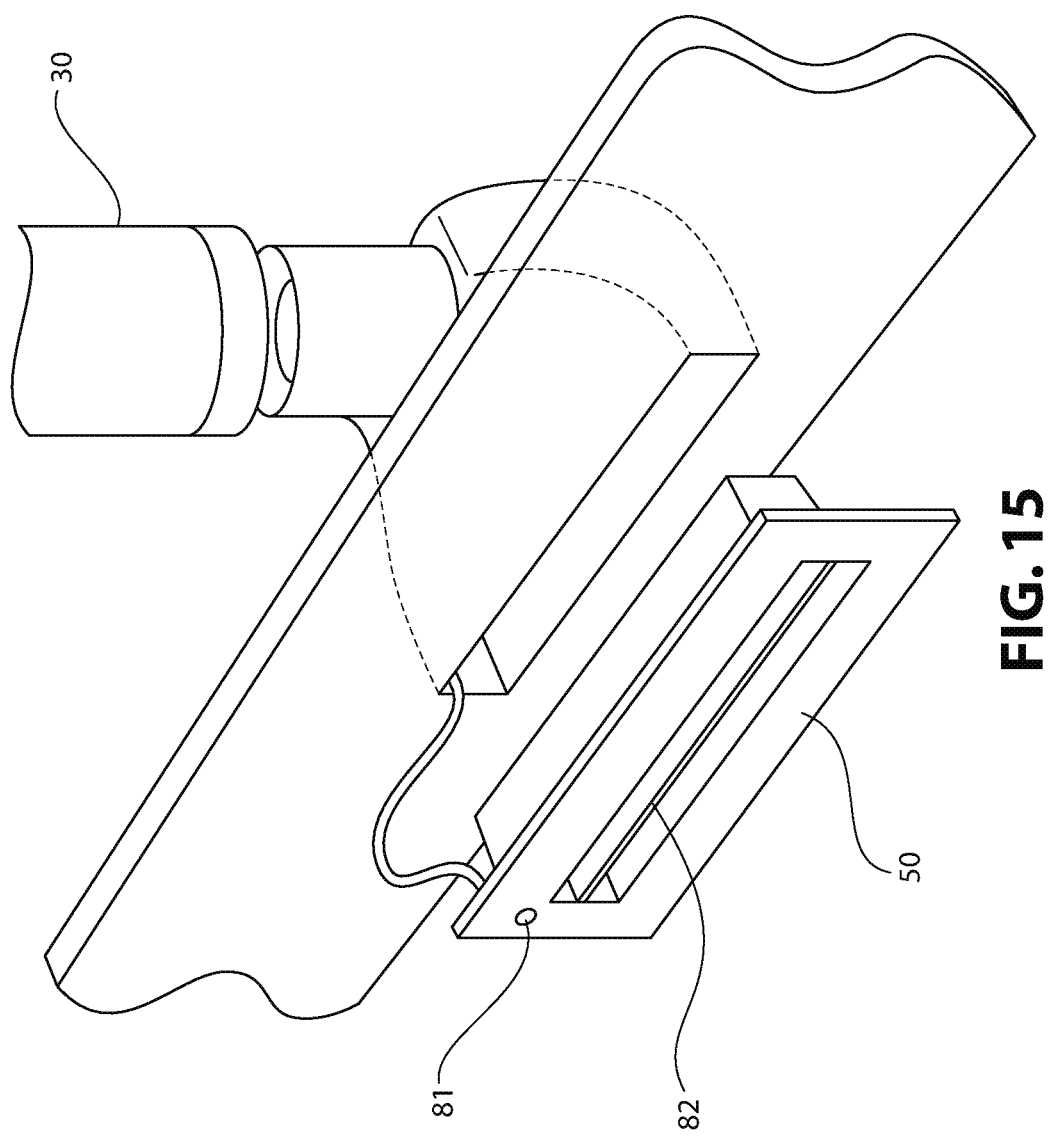
FIG. 15 is a perspective view of another embodiment of an air terminal having a sensor and air guides.

As shown in FIGS. 1 and 2, the system 10 of the present invention can also include additional sensors 81 located within the manifold 18, the air handling unit 12, and/or the outdoor air unit 11. These additional sensors 81 can determine the conditions within the air distribution mechanisms as well as the outside conditions. Sensors 81 can further be embedded within the air terminals 50 to measure air temperature or static pressure as shown in FIGS. 14 and 15. Energy harvesting technology may be embedded in the air terminals 50 to power the sensors 81. The air terminals 50 can also include air guides 82 that direct and further control the amount of air entering a room/zone.

Referring to FIG. 1, the system 10 can further include a controller 90 that is in operable communication with the sensors 81 such that measurements and other data gathered by the sensors 81 can be transferred or accessed by the controller 90. The controller 90 may include one or more microprocessors, CPUs, and/or other computing devices including, for example, a mobile application device 91 such as a cell phone. In some embodiments, measurements and other data gathered by the sensors 81 are transferred by sending a signal to a base station at regular intervals that is accessible by the controller 90. The sensors 81 can also be configured with a parameter threshold (for example a temperature threshold) and send data every time a measurement changes beyond the predetermined threshold.

One or more computer-readable storage mediums can be in operable communication with the controller 90 and contain programming instructions that, when executed, cause the controller 90 to perform multiple tasks. This includes programming algorithms that allow the controller 90 to automatically control the positioning of the airflow regulating dampers 36 based on the data gathered by the sensors 81. The air handling unit 12 can also be controlled by the controller 90 using programming algorithms to regulate the fan/blower speed and thermal capacity (compressor speed). For example, the controller 90 can adjust an ECM motor speed to obtain a desired airflow rate and static pressure. The fan/blower can be controlled to provide enough static pressure that the zones throughout a building receive sufficient airflow. If enhanced dehumidification is favored, the fan/blower speed can be reduced to increase latent removal. Thermal capacity can also be modulated so that the supply of air temperature stays above or below a safe level. Additionally, algorithms can be programed with knowledge of the heat exchanger efficiency curve to optimize the airflow so that fan energy is minimized, while the heat transfer effectiveness is maximized.

In certain embodiments, a pre-processor algorithm is used to determine the operative temperature in each zone based on sensor 81 measurements taken from the perimeter of each zone, such as from a wall or ceiling mounted register. The pre-process algorithm is based on measured data from the sensors 81 that is correlated to the expected average zone conditions. The algorithm can also identify aberrations in measurements such as from direct sunlight on the sensor 81.

In some embodiments, the programming algorithms are configured to pick different stages of operation depending on zone conditions within the building. If all zones are within two degrees of a temperature set-point, a linear function can relate zone temperature to airflow regulating dampers 36. If one or more zones begin to drift from the temperature set-point, such as by greater than two degrees, for example, an exponential function may be selected to favor airflow to the drifting zones. If one zone drifts significantly, such as a western facing bedroom in the evening, a boost mode may be automatically selected to deliver excess airflow to several zones. In this mode, airflow is directed away from comfortable zones and sent to the uncomfortable zone.

The programming instructions can also include an initial learning phase in which regression is used to understand the thermal mass and dynamic response of a zone. Once each zone's response has been characterized, the system 10 may distribute additional air into a zone to offset peak demand. Alternatively, the system 10 may limit air to certain zones knowing that they will not drift significantly, re-directing that air to other zones.

In addition, system 10 can also use air temperature measurements from each zone to predict zone orientation to pre-cool zones which suffer from higher solar gains. In some embodiments, zone over-heating time can be correlated with the known sun position to understand room orientation. For instance, a southern facing room can over-heat at a different time than a western or eastern facing room. The system 10 can use this information to supply different airflow rates to the different zones/rooms at different times to maintain the desired temperature. The system 10 can also use this information to automatically operate the blinds or other components within the zones/rooms to help control the temperature.

Figure 16:
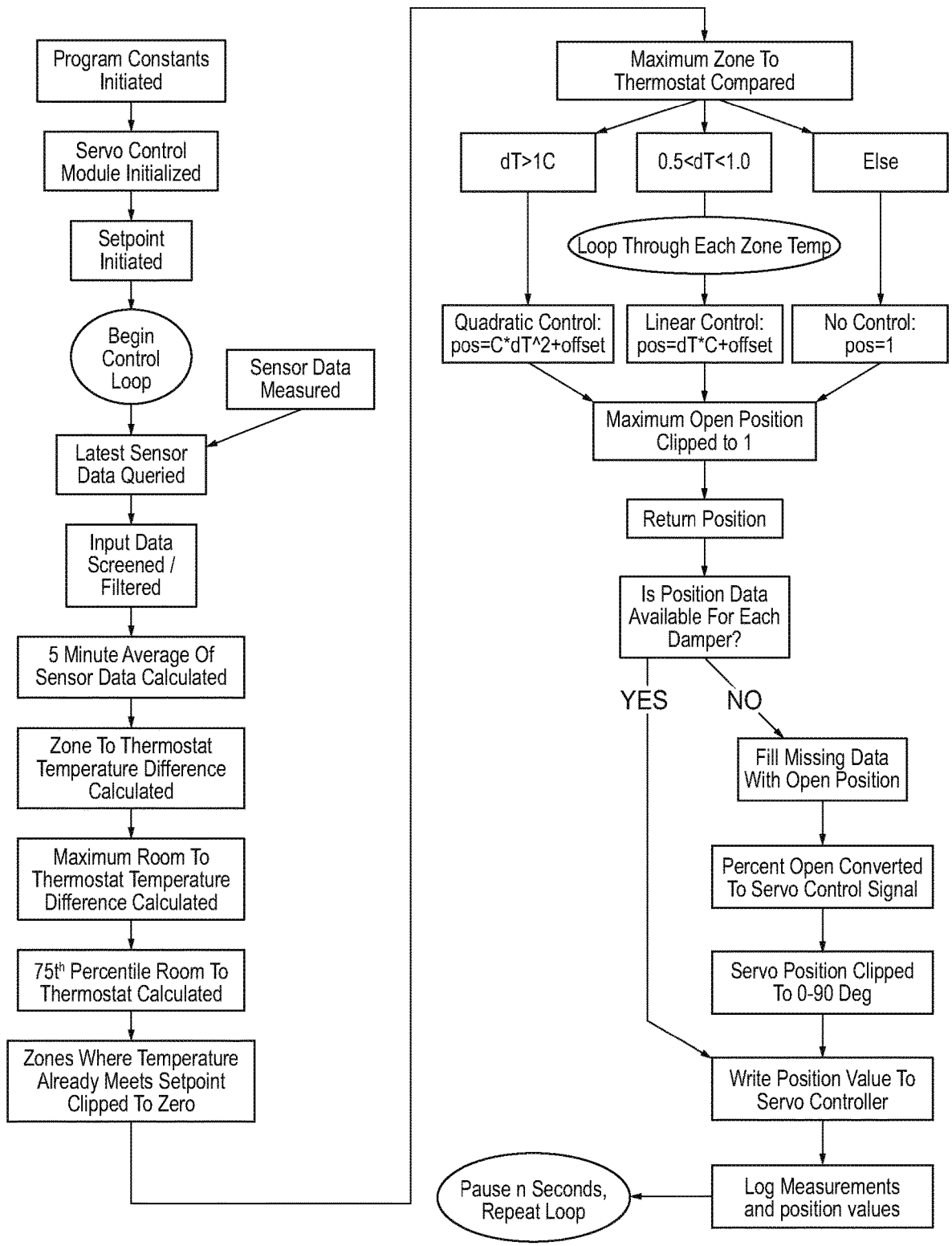
FIG. 16 is a flow chart of logic for controlling the indoor environment of a building according to one embodiment of the present invention.

In some embodiments, the programming algorithms utilize designer comfort profiles. The designer comfort profiles supply unique temperature profiles throughout an occupant's sleep period to maximize restfulness and slowly wake the occupant when desired. For instance, individuals who work non-typical hours, such as night shifts, can use a designer comfort profile that mimics typical nighttime temperature swings during daytime sleep. The programming algorithms can also include models to predict the thermal response of zones and supplement incomplete sensor information. For example, a multi-zone energy model of a house could be used to predict individual zone loads based on weather information. This information from the design phase can then be translated to a detailed model. In certain embodiments, at least one temperature sensor value is predicted by a model designed to accept as an input the other sensors positioned throughout the building. The predicted temperature can then be used as the temperature set-point or range. An example of the steps and logic of controlling the indoor environment of a building is shown in FIG. 16.

The indoor environmental control and air distribution system 10 can be installed using various techniques. In some embodiments, a specialized design approach is used for installing the system 10. For example, a number of air distribution conduits 30 can be selected to match the peak load of each zone in the building. The designer can round up on the number of air distribution conduits 30 to provide a system 10 that is easily capable of modulating the desired airflow. In certain embodiments, this design process is automatically obtained by inputting the architectural and enclosure parameters as well as exterior environmental conditions into a controller 90. Based on this input, estimated building thermal loads and airflow requirements will be calculated. From these calculations, the number of air distribution conduits 30 can be determined for each zone, along with their routing. Once the system 10 parameters have been completely obtained, a bill of materials and installation instructions can be generated.

Whereas particular embodiments of this invention have been described above for purposes of illustration, it will be evident to those skilled in the art that numerous variations of the details of the present invention may be made without departing from the invention as defined in the appended claims.

The invention claimed is:

1. An indoor environmental control and air distribution system for a building comprising:
    an air handling unit;
    a manifold connected to the air handling unit, said manifold comprising a chamber formed by a plurality of walls and a plurality of orifices formed through at least one of the walls;
    air distribution conduits each independently having a first end connected to the orifices of the manifold and a second end extending out from the manifold into different zones throughout the building; and
    an airflow modulating device comprising one or more airflow regulating dampers independently configured to move into at least two positions in which each position provides a different percentage of total air volume to each air distribution conduit,
    wherein the manifold comprises a slot that receives a cleaning device.

2. The system of claim 1, further comprising sensor devices positioned in at least one of the zones of the building, the sensor devices configured to determine temperature.

3. The system of claim 2, further comprising a controller in operable communication with the sensor devices and wherein the controller is configured to automatically control at least the air handling unit.

4. The system of claim 3, further comprising one or more computer-readable storage mediums in operable communication with the controller and containing programming instructions that, when executed, cause the controller to adjust a positioning of the modular airflow regulating device when at least a temperature set-point is exceeded.

5. The system of claim 2, wherein the sensors are further configured to determine at least one of relative humidity, organism occupancy, carbon dioxide, infrared light intensity, and visible light intensity.

6. The system of claim 1, wherein the airflow regulating dampers are adjusted in concert such that each air distribution conduit receives a desired percentage of air flow based on a total volume of air supplied by the air handling unit.

7. The system of claim 1, wherein the manifold comprises ports formed through at least a second wall of the chamber.

8. The system of claim 1, wherein the manifold comprises a firestop mechanism formed within the chamber that is configured to prevent spread of combustion.

9. The system of claim 1, wherein the air distribution conduits have a diameter of 3.5 inches or less.

10. The system of claim 1, wherein the air distribution conduits are made of a plastic material.

11. The system of claim 1, wherein the airflow regulating dampers comprise pressure sensors configured to determine volumetric airflow rate, and wherein the pressure sensors are in operable communication with the controller.

12. The system of claim 1, wherein at least one of the airflow regulating dampers is a firestop damper that is configured to close in response to a predetermined temperature.

13. The system of claim 1, wherein air terminals positioned within the different zones of the buildings that are configured to mix and diffuse air exiting the second end of the air distribution conduits, wherein the air terminals comprise sensors that are configured to determine temperature.

14. The system of claim 1, wherein the airflow modulating device is a separate container that is inserted into the manifold through a slot.

15. The system of claim 14, wherein the container comprises a plurality of holes with the airflow regulating dampers positioned within each of the holes, and wherein each hole of the container is aligned with each orifice formed through the wall of the manifold.

16. A method for controlling an indoor environment of a building comprising:
    a) measuring at least temperature with sensors provided on air terminals positioned throughout different zones of a building; and
    b) adjusting an amount of airflow into each zone of the building when the measured temperature exceeds or drops below a temperature set-point or range,
    wherein the amount of airflow is controlled by adjusting a position of one or more airflow regulating dampers of an airflow modulating device, and wherein the airflow regulating dampers are independently configured to move into at least two positions in which each position provides a different percentage of total air volume to each air distribution conduit, and
    wherein the air terminals are configured to mix and diffuse air exiting air distribution conduits, wherein the air distribution conduits each independently have a first end connected to one of the airflow regulating dampers and a second end extending into at least one of zones throughout the building, and
    wherein the controller determines an operative temperature in each zone of the building based on sensor measurements taken from a perimeter of each zone that are correlated to expected zone conditions.

17. The method of claim 16, wherein at least one temperature sensor value is predicted by a model designed to accept as an input additional sensors positioned throughout the building, and wherein the predicted temperature is used as the temperature set-point or range.

18. The method of claim 16, wherein the position of the airflow regulating dampers are automatically adjusted by a controller in operable communication with one or more computer-readable storage mediums.

19. The method of claim 16, further comprising automatically regulating air from the air handling unit with the controller in operable communication with the one or more computer-readable storage mediums.

20. The method of claim 16, wherein the sensors are further configured to determine an additional condition of each zone to adjust the amount of airflow, and wherein the additional condition is selected from relative humidity, organism occupancy, carbon dioxide, infrared light intensity, visible light intensity, or a combination thereof.

* * * * *